Dec. 8, 1942.　　　R. R. HARMON　　　2,304,733
GAS SCRUBBER
Filed July 9, 1941　　　2 Sheets-Sheet 1

INVENTOR.
Robert R. Harmon
BY
ATTORNEY

Dec. 8, 1942.  R. R. HARMON  2,304,733
GAS SCRUBBER
Filed July 9, 1941  2 Sheets-Sheet 2
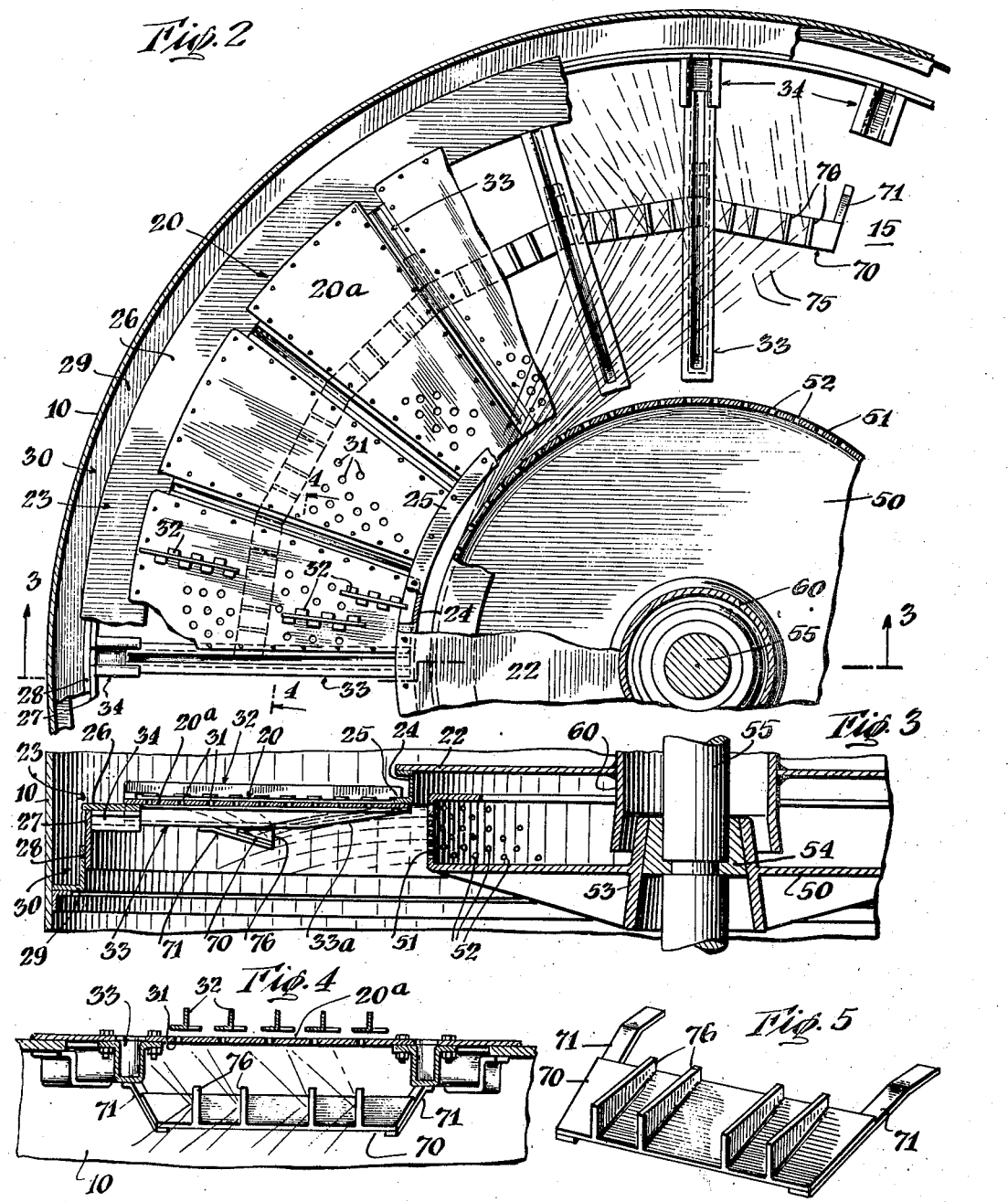
INVENTOR.
Robert R. Harmon
BY
ATTORNEY Patented Dec. 8, 1942

2,304,733

UNITED STATES PATENT OFFICE 2,304,733

GAS SCRUBBER

Robert R. Harmon, Charlottesville, Va., assignor to Peabody Engineering Corporation, New York, N. Y., a corporation of New York Application July 9, 1941, Serial No. 401,557

9 Claims. (Cl. 261—113)

This invention relates to a novel and improved method and apparatus for cleaning or purifying industrial gases or air and more particularly to a novel and improved apparatus of the general type which first removes the bulk of the coarse particles, then the fine particles of dust, fume or the like, and finally the tiny droplets of liquid which may be entrained by the gases.

An object of the invention is to provide a novel and improved apparatus of the above type which is suited for commercial operation.

Another object of the invention is to provide, in a scrubber of the above type having a plate with orifices through which gases pass at suitable velocity, novel and improved means for washing said plate.

Another object is to provide, in an apparatus of the above type, novel and improved spray means for washing the under surface of the orifice plate.

Another object is to provide, in an apparatus of the type above indicated, novel and improved means to produce a liquid spray having a comparatively flat trajectory.

Another object is to provide, in an apparatus of the type above indicated, centrifugal spray means for washing and cleaning the under surface of the orifice plate.

Another object is to provide a centrifugal liquid spray of the type above indicated which contacts with the under surface of the orifice plate across its entire radius.

Various other objects and advantages will be apparent as the nature of the invention is more fully disclosed.

Although the novel features which are believed to be characteristic of this invention are pointed out more particularly in the claims appended hereto, the invention itself may be better understood by referring to the following description, taken in connection with the accompanying drawings forming a part thereof in which a specific embodiment has been set forth for purposes of illustration.

In the drawings:

Fig. 2 is a horizontal section taken along the line 2—2 of Fig. 1 with parts broken away;

Fig. 3 is a vertical radial section taken along the line 3—3 of Fig. 2;

Fig. 4 is a partial vertical transverse section taken along the line 4—4 of Fig. 2 and Fig. 5 is a perspective view of an uplift baffle plate for redirecting the liquid spray onto the bottom of the orifice plate and vanes to distribute the redirected spray.

Figure 1:
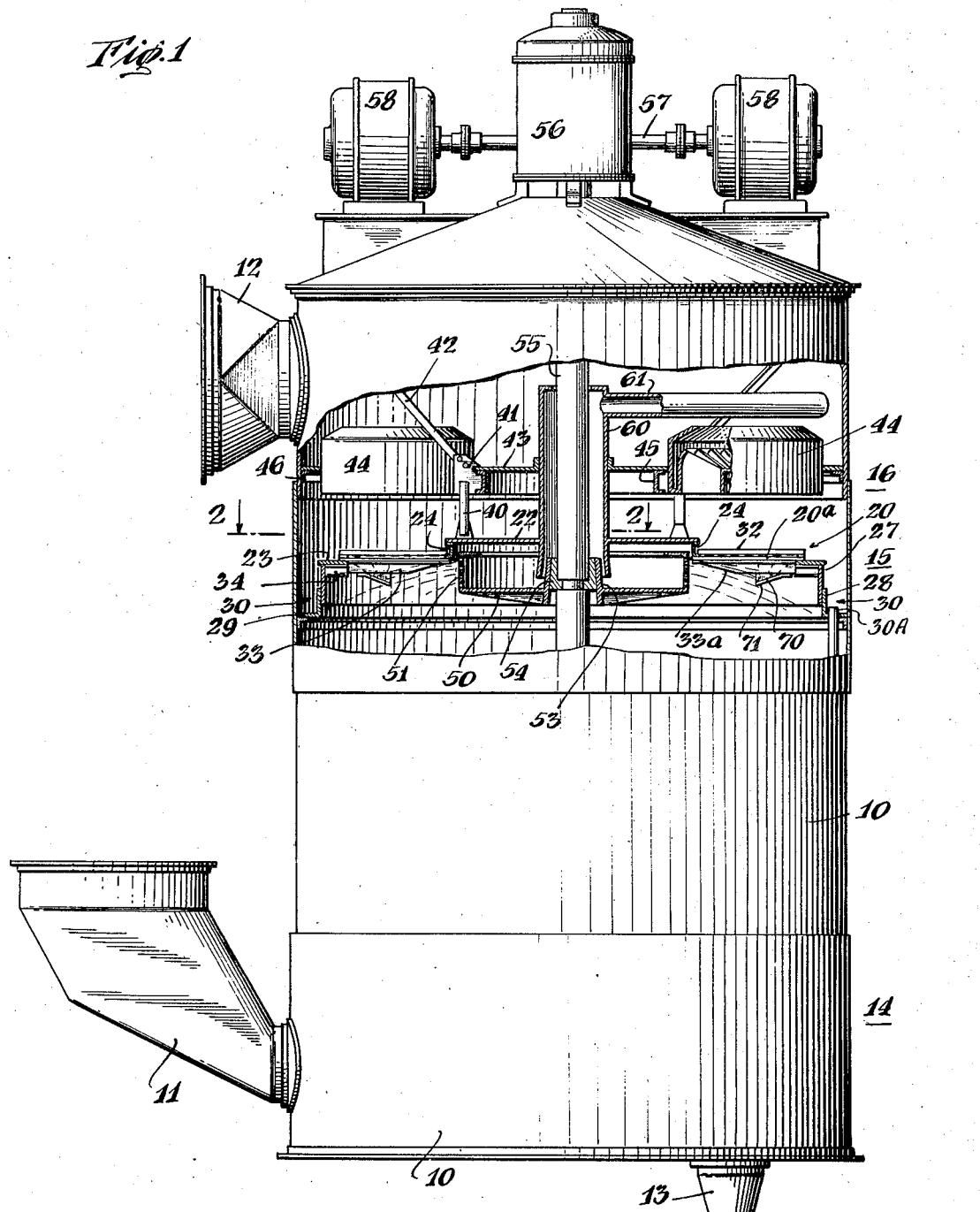
Fig. 1 is a side elevation of a gas scrubber embodying the present invention, with parts broken away to show the construction thereof.

In the following description and in the claims certain specific terms are used for convenience in referring to various details of the invention. These terms, however, are to be given as broad an interpretation as the state of the art will permit.

Referring to the drawings more in detail, the invention is shown as applied to a scrubber of the general type shown in my Patent No. 2,226,128 dated Dec. 24, 1940, comprising a vertical cylindrical shell or casing 10 having a gas inlet header 11 through which the gases to be cleaned are supplied to the shell, a gas outlet header 12 through which said gases are removed after cleaning, and a suitable drain 13 at the bottom of the cylindrical shell 10 to permit removal of the waste liquid and entrained solid particles. A primary settling or cleaning zone 14 may be provided at the lower end of the shell or casing 10 having suitable means for removing the larger particles. The scrubber is also provided with a secondary cleaning or scrubbing zone 15 above the primary cleaning zone 14, and with a drying zone 16 containing a plurality of water eliminators 44 adapted to remove the droplets of cleaning liquid from the gases. The scrubbing zone 15 may comprise a plurality of circular orifice plates 20 arranged one above another in the casing 10, only one of such plates being shown herein for purposes of illustration.

In accordance with the present invention, the baffle plate 20 is shown as comprising a plurality of segments 20a which are mounted between a central imperforate plate 22 and an outer annular rim 23. The plate 22 may be provided with an annular rim 24 having a horizontal flange 25 to which the orifice plate segments 20a are secured. The outer annular rim 23 may comprise an angle member having a horizontal flange 26 to which the outer edges of the segments 20a are secured, and a vertical flange 27 engaging the flange 28 of an angle member 29 which is attached to the shell 10 and forms an annular gutter 30 around the inner wall thereof.

The orifice plate 20 is provided with orifices 31 through which the gases pass, and carries a set of impingement baffles 32 disposed over said orifices 31 in a position such that the gases, after passing through said orifices, impinge thereon.

The radial edges of the segments 20a of the orifice plate 20 are supported on radial members 33 shown as channel shaped gutters which extend between the flange 25 of the plate 22 and channel members 34 which are attached to the flange 27 of the rim 23 and communicate with the annular gutter 30. The radial gutters 33 form overflow drains to receive liquid from the orifice plate segments 20a and to discharge the same into the annular gutter 30, from which it may be supplied to the next lower orifice plate by suitable means, such as an overflow pipe 30a.

The plate 22 is shown as supported by a plurality of struts 40 connected to gusset plates 41 which are in turn supported by diagonal stays 42 connected to the top of the shell 10 by any suitable means not shown. The gusset plates 41 are shown as attached to a transverse plate 43 in which a plurality of water eliminators 44 are set. The water eliminators 44 may be of any desired type, for example, the type shown in my Patent 2,226,128 above mentioned which comprises a plurality of radial vanes between which the gases pass upwardly at a progressively increasing velocity and are caused to rotate so as to impinge against the peripheral walls thereof and centrifugally remove the droplets of liquid which may be entrained in the gases.

An annular channel member 45 may be secured to the plate 43 for strengthening purposes. The outer periphery of the plate 43 may be attached to the shell by suitable means such as an annular angle member 46.

For washing the under surface of the orifice plate 20 and for supplying cleaning liquid to form a liquid blanket on the plate 20, there is provided a rotating drum 50 having a circular side wall 51 provided with apertures 52, and having a tapered hub member 53 seated on a tapered slit bushing 54 secured to a rotating shaft 55 which extends vertically through the shell 10. The shaft 55 is connected by means of a gear train, not shown, mounted in gear housing 56 to the shafts 57 of one or more motors 58. In the embodiment shown two motors 58 have been provided. These motors may be selectively connected to drive the shaft 55 by suitable clutch means in the gear housing 56. It is to be understood, however, that only one motor may be provided if desired in any particular installation.

For supplying water or other cleaning liquid to the rotating drum 50 an axial sleeve 60 is provided which is mounted around the rotating shaft 55 and may be secured to the plate 22 and the plate 43 as indicated. The sleeve 60 communicates with a pipe 61 which extends through the shell 10 to receive water from the exterior thereof.

It has been found that in a scrubber of the type above described the centrifugal spray, because of its trajectory, tends to fall away from the under surface of the plate 20 as it advances toward the outer periphery thereof, particularly in large diameter installations. Hence a non-uniform washing or cleaning action is obtained. In accordance with the present invention this is avoided by providing a plurality of segmental uplift baffles 70 at the radial position required to lift and redirect upwardly the spray from the drum 50 as it tends to fall away from the under surface of the plate 20. These baffles 70 are shown as segmental plates attached to struts 71 which are secured to the under surface of the gutters 33 above mentioned. It is to be understood, of course, that the baffles 70 may be curved to form a substantially continuous annular conical member and may be secured in any convenient manner. A specific construction has been shown merely for purposes of illustration.

It has been found that the spray discharged centrifugally from the drum 50 tends to take a tangential direction as indicated by the lines 75 in Fig. 2 and is prevented from contacting a substantial portion of the plate 20 by the depressed radial channel members 33.

The gutters 33 are accordingly inclined upwardly at their inner ends as at 33a to provide clearance for the spray. In order to redirect the spray radially between the gutters 33 to the outer portion of the under surface of the plate 20, a plurality of vertical vanes 76 are mounted on the uplift baffles 70 in the path of the spray. These vertical vanes 76 may be spaced along the baffles 70 as desired. In the embodiment shown, the vanes 76 extend transversely of the baffles 70. They may, however, extend substantially radially or be curved.

*Operation*

In the operation of this device, gas or air heavily laden with dust, fume or other matter enters the scrubber through the inlet header 11 and a large portion of the entrained foreign matter is removed from the gas stream in the primary cleaning zone 14 and settles to the bottom of the casing, from which it may be withdrawn through the drain 13.

The gas stream, after this preliminary cleaning, passes upwardly through the orifice plates 20 and impinges on the baffles 32.

During this operation the shaft 55 is continuously rotated by means of the motors 58 and water or other cleaning fluid is supplied to the drum 50 through the pipe 61 and the sleeve 60. Water is discharged centrifugally through the apertures 52 of the rotating drum 50 and forms a substantially horizontal spray as indicated by the lines 75 in Fig. 2. The spray is directed along the undersurface of the plate 20 and tends to wash and clean the same. The spray is so positioned that the rising gases pass therethrough on their way to the orifice plate 20 and carry the liquid against the under surface of the plate and through the orifices to form a liquid blanket on the plate through which the gases pass on their way to the impingement baffles 32.

Any of the coarser particles which were not removed in the lower portion of the scrubber are removed by the centrifugal spray. The finer particles are removed by the action of the orifice plate 20 and baffle grid 32 and any droplets of water which may be picked up by the gases are removed by the driers 44.

The spray, as it tends to fall away from the under surface of the orifice plate 20 due to its trajectory, impinges upon the uplift baffles 70 and is redirected upwardly onto the under surface of the plate. The vertical vanes 76 redirect the spray in a radial direction between the channels 33 so as to cover the portions of the segments 20a which would otherwise be shielded from the spray by the channels 33. In this way the entire lower surface of the plate is washed.

It is to be understood, of course, that vertical baffles as above described may be positioned near the axis of the casing so as to engage the spray shortly after it has been discharged from the drum 50. In this way the spray may be caused to assume a substantially radial direction throughout. It is also to be understood that a plurality of sets of redirecting baffles 70 and vanes 76 may be used if desired to maintain the spray in contact with the entire under surface of the plate 20. By this means a substantially uniform horizontal spray is maintained in a given horizontal plane across the entire scrubber.

It is to be understood that the redirecting means for this purpose may be used in other types of apparatus and that the invention is not restricted to use with the particular type of orifice plate and baffle grid disclosed herein. In certain instances a horizontal spray may be used as a primary cleaning means entirely apart from the orifice plate assembly described above.

Although a specific embodiment of the invention has been shown for purposes of illustration, it is to be understood that the invention is not to be restricted thereto, but that various changes and modifications may be made therein as will be readily apparent to a person skilled in the art. The invention is only to be limited in accordance with the scope of the following claims.

What is claimed is:

1. An apparatus for cleaning gases comprising an upright casing, a cleaning zone in said casing comprising a transverse plate having a plurality of openings therein forming orifices through which the gas passes, spray means located below said plate to produce a substantially horizontal transverse spray directed to wash the under surface of said plate, and baffle means disposed in the path of said spray to engage and redirect said spray upwardly toward the lower surface of said plate, said baffle means being positioned to prevent the spray from falling away from the lower surface of said plate due to its normal trajectory whereby the entire lower surface of said plate is washed thereby.

2. An apparatus for cleaning gases comprising an upright casing, a cleaning zone in said casing comprising a transverse plate having a plurality of openings therein forming orifices through which the gas passes, spray means located below said plate to produce a substantially horizontal transverse spray directed to wash the under surface of said plate, and baffle means disposed in the path of said spray to engage and redirect said spray upwardly toward the lower surface of said plate, said baffle means being positioned to prevent the spray from falling away from the lower surface of said plate due to its normal trajectory whereby the entire lower surface of said plate is washed thereby, means passing gases to be cleaned upwardly in said casing through said spray and through said orifices.

3. An apparatus for cleaning gases comprising an upright casing, a cleaning zone in said casing comprising a transverse plate having a plurality of openings therein forming orifices through which the gas passes, centrifugal spray means in said casing adapted to produce a substantially horizontal spray extending radially of said casing and directed to wash the under surface of said plate, and baffle means below said plate disposed in the path of said spray to engage and redirect the same upwardly toward the lower surface of said plate, said baffle means being positioned to prevent the spray from falling away from the lower surface of said plate due to the normal trajectory thereof, and to direct the same along the entire lower surface of said plate.

4. An apparatus for cleaning gases comprising an upright casing, a cleaning zone therein comprising a transverse plate formed in a plurality of spaced segments having radial support members below and between adjacent segments, said plates having openings therein forming orifices through which the gas passes, baffle means disposed above and in registration with said orifices in a position such that the gases and the entrained matter impinge thereon, means forming beneath said plate a substantially horizontal spray which is directed to wash the lower surface thereof, an annular baffle means mounted between said radial members below said plate in a position to engage said spray for redirecting the same upwardly toward the under surface of said plate, said annular baffle means being positioned to prevent the spray from falling away from the under surface of said plate due to the normal trajectory thereof.

5. An apparatus for cleaning gases comprising a transverse plate formed in a plurality of spaced segments having radial support members below and between adjacent segments, said plates having openings therein forming orifices through which the gas passes, baffle means disposed above and in registration with said orifices in a position such that the gases and the entrained matter impinge thereon, means forming a substantially horizontal spray beneath said plate which is directed to wash the lower surface thereof, an annular baffle means mounted between said radial members below said plate in a position to engage said spray for redirecting the same upwardly toward the under surface of said plate, said annular baffle means being positioned to prevent the spray from falling away from the under surface of said plate due to the normal trajectory thereof, and vertical vanes to redirect said spray radially between said radial members.

6. An apparatus for cleaning gases comprising an upright casing, a cleaning zone therein comprising a transverse plate formed in a plurality of spaced segments having radial support members below and between adjacent segments, said plates having openings therein forming orifices through which the gas passes, baffle means disposed above and in registration with said orifices in a position such that the gases and the entrained matter impinge thereon, centrifugal spray means below said plate to produce a horizontal spray directed to wash the under surface of said plate, and baffle means disposed in the path of said spray to redirect the same upwardly toward the lower surface of said plate, said last baffle means being positioned to prevent the spray from falling away from the lower surface of said plate and to direct the same along the entire lower surface of said plate.

7. An apparatus for cleaning gases comprising an upright casing, a cleaning zone therein comprising a transverse plate formed in a plurality of spaced segments having radial support members below and between adjacent segments, said plates having openings therein forming orifices through which the gas passes, baffle means disposed above and in registration with said orifices in a position such that the gases and the entrained matter impinge thereon, centrifugal spray means located axially of said casing below said plate to produce a horizontal spray directed to wash the under surface of said plate, and baffle means disposed in the path of said spray to redirect the same upwardly toward the lower surface of said plate, said last baffle means being positioned to prevent the spray from falling away from the lower surface of said plate whereby the entire lower surface is washed thereby, said radial support members being tapered upwardly to permit passage of said spray, and vertical vanes engaging the spray which has passed said tapered portion to redirect the same radially so as to cover the entire surface of said plate between said members.

8. An apparatus for cleaning gases comprising an upright casing, a cleaning zone therein comprising a transverse plate formed in a plurality of spaced segments having radial support members below and between adjacent segments, said plates having openings therein forming orifices through which the gas passes, baffle means disposed above and in registration with said orifices in a position such that the gases and the entrained matter impinge thereon, centrifugal spray means located axially of said casing below said plate to produce a horizontal spray directed to wash the under surface of said plate, and baffles positioned to engage and direct said spray radially to cover the entire surface of said plate between said radial members.

9. An apparatus for cleaning gases comprising an upright casing, a cleaning zone therein comprising a transverse plate formed in a plurality of spaced segments having radial support members below and between adjacent segments, said plates having openings therein forming orifices through which the gas passes, baffle means disposed above and in registration with said orifices in a position such that the gases and the entrained matter impinge thereon, centrifugal spray means located axially of said casing below said plate to produce a horizontal spray directed to wash the under surface of said plate, said radial support members being tapered upwardly to permit passage of said spray, and vertical vanes engaging the spray which has passed said tapered portion to redirect the same radially so as to cover the entire surface of said plate between said members.

ROBERT R. HARMON.